(No Model.)  5 Sheets—Sheet 1.
J. W. BOLTZ.
BRICK AND TILE CUTTER.
No. 473,446.  Patented Apr. 26, 1892.
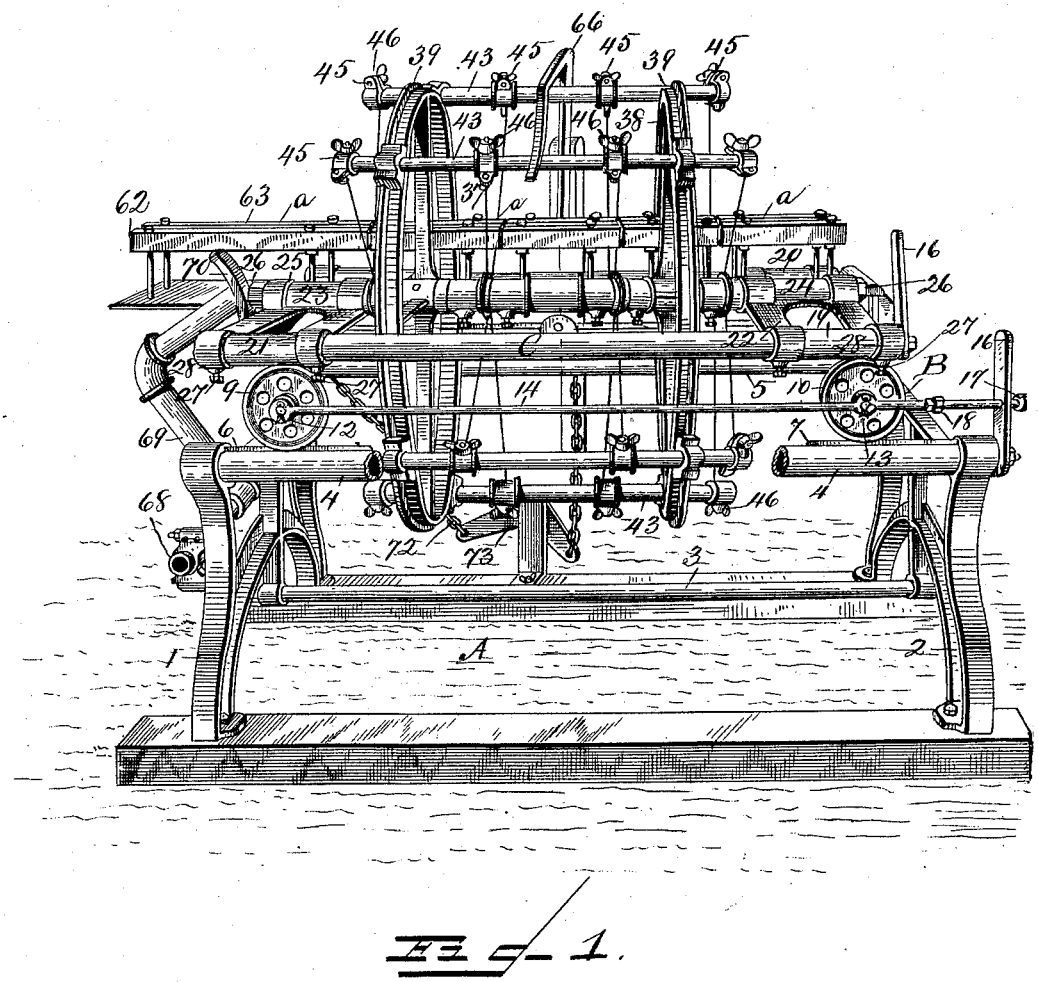
F I G. 1.
WITNESSES
F. L. Ourand
Albert B. Blackwood
INVENTOR
Jacob W. Boltz,
by A. G. Hughman,
Attorney.

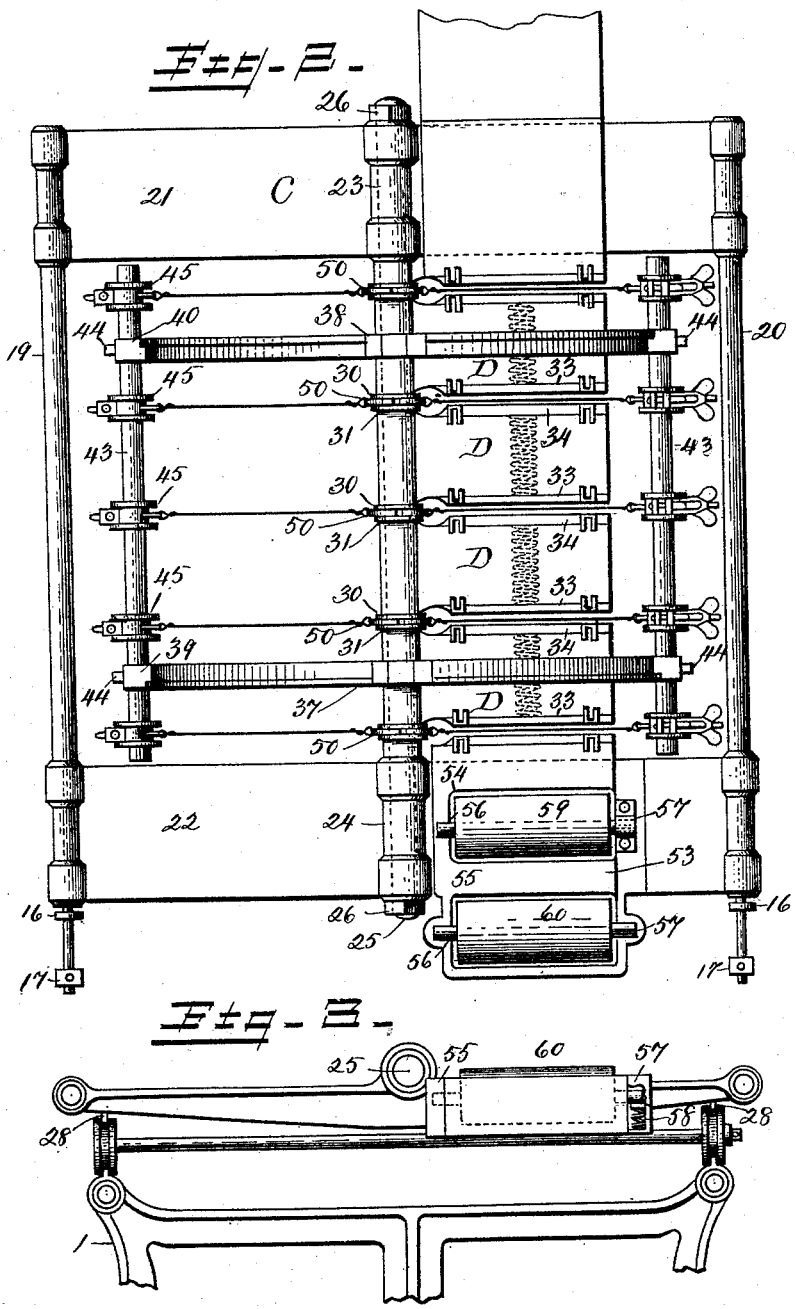

(No Model.) 5 Sheets—Sheet 3.
J. W. BOLTZ.
BRICK AND TILE CUTTER.
No. 473,446. Patented Apr. 26, 1892.
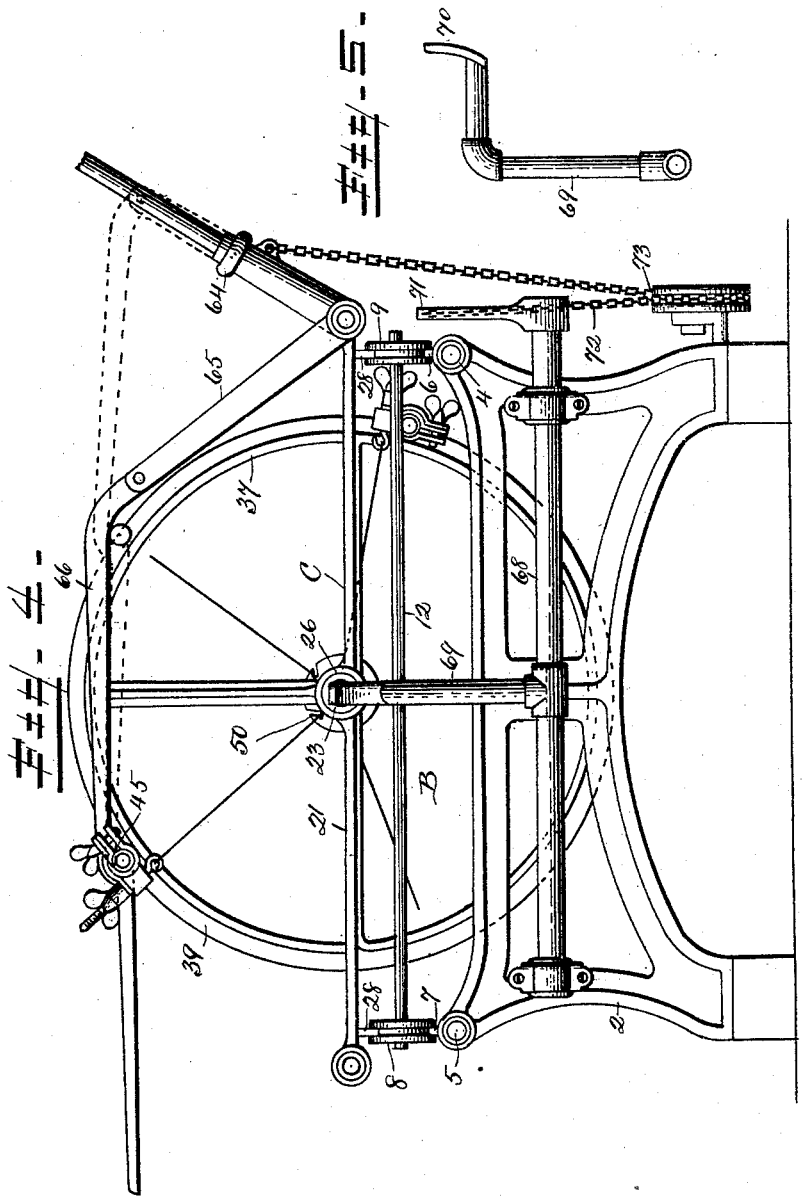
Witnesses
Albert B. Blackwood
Inventor
Jacob W. Boltz
by A. G. Heyfman
Attorney (No Model.) 5 Sheets—Sheet 4.

J. W. BOLTZ.
BRICK AND TILE CUTTER.

No. 473,446. Patented Apr. 26, 1892.

Witnesses
Albert B. Blackwood

Inventor
Jacob W. Boltz
by A. G. Heylmun,
Attorney (No Model.) 5 Sheets—Sheet 5.

J. W. BOLTZ.
BRICK AND TILE CUTTER.

No. 473,446. Patented Apr. 26, 1892.

Witnesses
Albert B. Blackwood

Inventor
Jacob W. Boltz
by A. G. Huysman
Attorney

UNITED STATES PATENT OFFICE.

JACOB W. BOLTZ, OF GALESBURG, ILLINOIS.

BRICK AND TILE CUTTER.

SPECIFICATION forming part of Letters Patent No. 473,446, dated April 26, 1892.

Application filed January 23, 1892. Serial No. 419,075. (No model.)

*To all whom it may concern:*

Be it known that I, JACOB W. BOLTZ, a citizen of the United States of America, residing at Galesburg, in the county of Knox and State of Illinois, have invented a new and useful Cutting-Table for Brick and Tile Machines, of which the following is a specification.

My invention relates to improvements in cutting-tables for brick and tile machines and their associated mechanism for severing a column or slab of clay into forms or bricks as it progresses from the clay-machine or moves from a table placed intermediate of the machine and the cutting-table.

My invention primarily consists of a cutting-table with a platen having transversely-arranged wire-slots across it, stationary pulleys on the frame, moving or revolving rims on the rims of the fixed pulleys, and wire-holding cutting-frame on the revolving rims.

The invention also consists in the novel construction and combination of parts, as will be hereinafter more fully specified, and particularly pointed out in the claims.

I am aware that rotating reels carrying cutting-wires have been arranged to cut the column of clay transversely and also that rotating wheels with radially-arranged cutting-wires have been heretofore used. My invention has for its object the simplification and improvements of these devices, and it accomplishes this by the mechanism hereinafter specified, and which is fully and clearly illustrated in the accompanying drawings, wherein—

Figure 6:
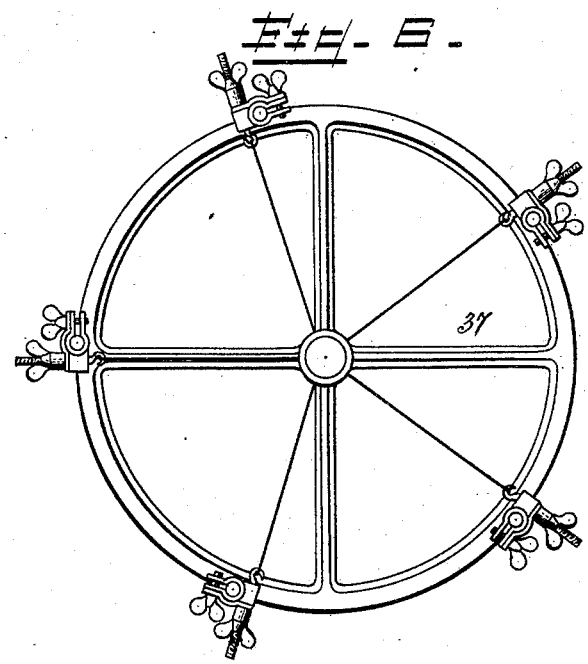
Figure 7:
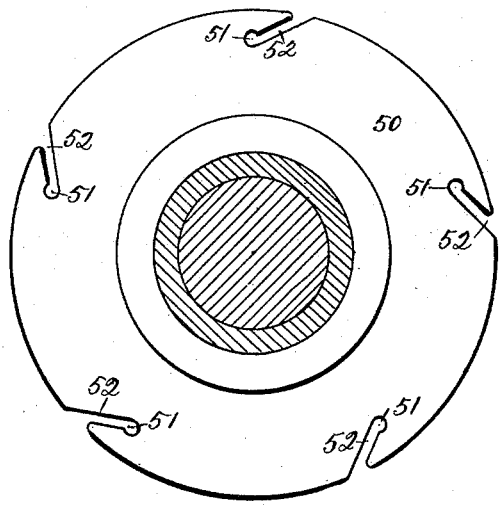
Figure 8:
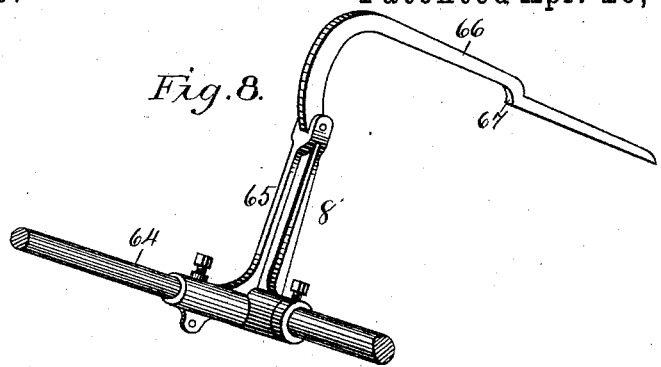
Figure 9:
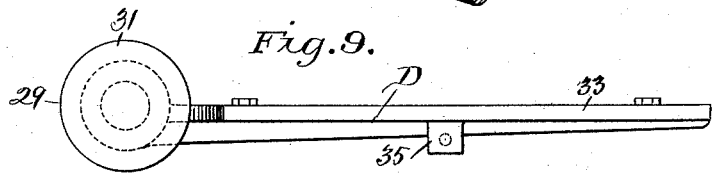
Figure 10:
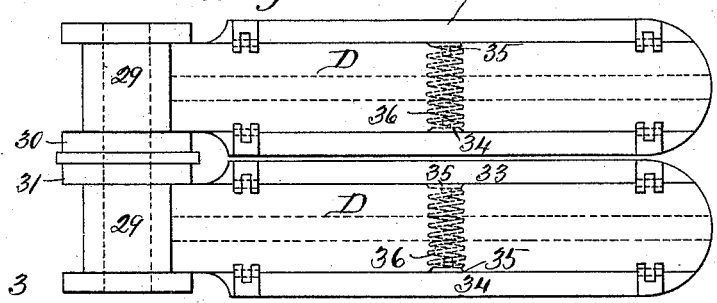
Figure 15:
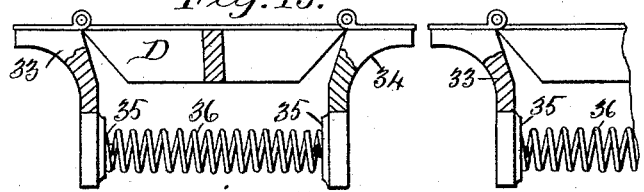
Figure 14:
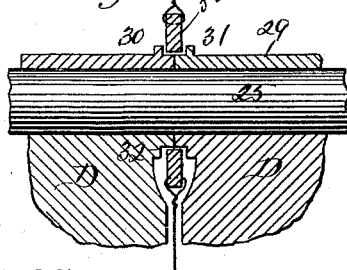
Figure 11:
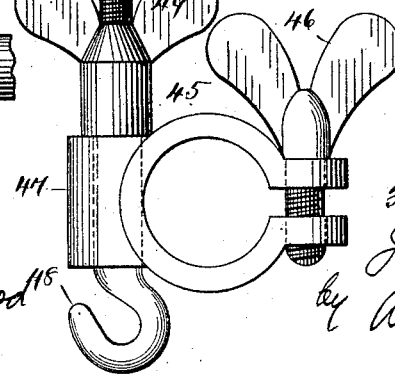
Figure 12:
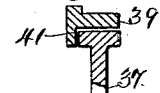
Figure 13:
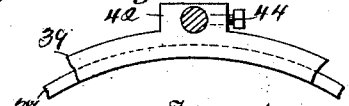

Figure 1 is a perspective view of the machine, taken from the rear. Fig. 2 is a top plan view showing the platens and the wire-cutting reel, the top wire-holding bar being removed from the wheels. Fig. 3 is a detail end view showing the carrying-rollers and end bed-piece and end roller. Fig. 4 is an end view of the machine. Fig. 5 is a detail view of the return lever for moving the table back. Fig. 6 is a view of one of the stationary wheels with band and wires. Fig. 7 is a view of the wire-holding ring made full size. Fig. 8 is a detail perspective of the operating-lever for turning the cutting-reel. Figs. 9 and 10 show side and plan views, respectively, of one of the platen-plates. Fig. 11 is a detail side view of one of the wire-holding hooks with clamping-sleeve. Fig. 12 is a detail transverse section of the rim of the stationary wheel and the rotating band. Fig. 13 is a detail of one of the seats on the rotating bands for holding the wire-holding bars. Fig. 14 is a detail view showing the position of the platens and the wire-holding ring or disk. Fig. 15 is a transverse section through the platen-plate, showing the spring for holding the hinged side pieces in alignment with the platen-plates.

A designates the bed-frame of the table, consisting of strong end pieces or benches 1 2, connected endwise by a bar 3. The upper outer ends of the benches support rods 4 5, keyed or bolted in position, substantially as shown, and formed on their upper faces for a distance at each end with longitudinally-arranged ribs 6 7, constituting tracks on which the carrying-wheels of the table rest and run.

On the rods 4 5 is a carriage B, consisting of the grooved wheels 8, 9, 10, and 11, mounted on axles 12 13, the ends of which project beyond the hubs of the grooved wheels and are connected by rods 14 15, each rod projecting beyond the axle of the rear wheels through a strap-bar 16, fixed on the end of the bed-frame, substantially as shown in Figs. 1 and 2 of the drawings. For the purposes of limiting the longitudinal movement of the carriage these projecting ends of the bars or rods 14 and 15 have an end nut 17 and an adjusting-nut 18, so that the distance traveled by the carriage is limited by the distance between these nuts. The carriage-wheels support the frame of the cutting-table C, consisting of two substantial side rails 19 20, connected at the ends by cross-plates 21 22, in the middle of which are bearings 23 24, which take a fixed shaft 25, having threaded ends provided with nuts 26, whereby the shaft may be clamped in fixed positions, and at the same time the platens be clamped tight and rigid in position, with the faces of their bearing-sleeves abutting. The plates 21 22 are held in position on the side bars by means of set-screws 27, substantially as shown, in which position they are set after being clamped up by the nuts on the fixed bar or shaft. Across the under faces of the end pieces or cross-plates 21 22 are formed ribs 28, setting in the grooves of the respective sheaves or grooved wheels, as indicated in Fig. 3 of the drawings. On the fixed shaft 25 are clamped the platens D. These consist of strong plates of metal having their upper faces planed off and at the rear formed with a sleeve 29 to take the fixed shaft 25. Near the abutting ends of these sleeves are formed annular ribs 30 31, (see Fig. 14,) the projecting ends of the sleeves when abutting constituting a bearing 32, around which the wire-holding ring or disk turns, the flanges of the sleeves serving as side supports to keep these rings in vertical position during rotation. The sleeves of the platens D are arranged on the fixed shaft, with the platens extending in a horizontal direction on a plane common to the series and then clamped together by the nuts on the ends of the fixed shaft, the frictional contact between the abutting ends of the sleeves holding them in the position to which set. These platens are made wider when "end-cut" bricks are made than when "side-cut" bricks are.

It sometimes happens during the passage of the wires through the slab of clay that obstructions are encountered which disturb the form and sometimes bend or break the wires. To obviate this difficulty, I provide the platens with side pieces 33 34, hinged to the fixed central portion or stationary platen-plate, and form the side pieces with lugs 35, having seats or lugs on their inner faces which support and retain a spreading-spring 36, substantially as seen in Fig. 15 of the drawings. This construction gives a yielding function to the platens in the region of the wire passages or slots, so that when a stone or other obstruction is met in the passage of the wires through the clay the side pieces of the platens will be depressed, opening the passage and permitting the obstruction to be discharged without injury to the wires.

At proper positions on the fixed shaft are mounted fixed wheels or pulleys 37 38, duplicates in construction. The hubs of these wheels are mounted on the fixed shaft, and the adjacent sleeves of the platens on both sides abut against the respective ends of the hubs. The rim-faces of the fixed pulleys are planed smooth and have fitted on them bands or tires 39 40, arranged to move in revolution around the rims, and to keep these bands on the pulleys they are formed with inward flanges 41, engaging or bearing against the outer edges of the rims of the fixed pulleys, as shown in detail in Fig. 12 of the drawings.

On the revoluble bands of the fixed pulleys at stated or determined distances are formed bearings or sleeves 42, in which are arranged bars 43, held in position by set-screws 44, substantially as shown in Fig. 13 of the drawings, and on these bars are adjustable sleeves 45, clamped in position by a set-screw 46, as shown in Fig. 11 of the drawings. A portion of the sleeve 45 projects, as at 47, and is formed with a sleeve to take the stem of a wire-holding hook 48 the end of the stem being threaded to take a thumb-nut 49, whereby the cutting-wire may be tightened or otherwise adjusted. As heretofore stated, on the bearings formed by the ends of the platen-sleeves between the annular flanges thereof are mounted wire-holding rings or disks designated by 50. These consist of a disk having a central aperture larger than the bearings or outer diameter of the platen-sleeve about which they revolve, as shown in Fig. 7, wherein a disk is shown of full size, and near the perimeter of the disks are radially-disposed apertures 51, from the lower portion of which are made tangentially-erected slots 52, opening at the circumference of the disk. This construction enables a loop on the inner end of the cutting-wire to be readily slipped down the slot over the metal into the aperture and there held without liability of escape. The bore or central aperture in the disk being made larger than the bearings or sleeve ends enables the disks to be held in suspension between the opposing wires and gives to the disk an adjustable function with resiliency not existing if held simply on the bearings.

In a platen-plate 53 at the forward end of the machine, one part of which plate extends beyond the frame of the machine, are formed pans or sinks 54 55, at the ends of which are bearings 56 57, yieldingly-supported on springs 58, (see Fig. 3,) in which are mounted lubricating-rollers 59 60 to distribute material to the under side of the moving column of clay as it progresses over the rollers onto the platens. At the delivery end of the table is a plain polished platen 61, extending beyond the end of the table to carry the forms onto a receiving or delivery table, (not shown,) as usual. On the platen and extending over on the extension at the end are parallel guide-rails 62 63, supported on standards let into the platens and its extensions. These guide-rails direct the column of clay in a straight line over the platen. These guide-rails are made in sections or pieces a, as seen in Fig. 1 of the drawings, the adjacent or approaching ends of the respective sections being arranged apart far enough to permit the cutting-wires to pass freely through as the cutting-frame is revolved.

On the front side rail of the table is fulcrumed a lever 64, the inner arm 65 of which is directed upward and has jointed to it an arm 66, formed with a notch 67, Fig. 8, to engage the bars on the revoluble bands, the arm 66 being extended beyond the notch far enough so that the end will not fall between the bars when the lever is drawn down or forward to its limit of movement. Across the end of the frame is journaled a bar 68, in the middle of which is fixed an upward-directed arm 69, bent inward and formed with a shoe 70, setting against the frame, as shown in Figs. 1 and 4. At the end of the bar 68 is an arm 71, having at its end a chain 72, leading down and attached to a bell-crank lever 73, or it may run under a pulley and the end of the chain attached to the lever 64, substantially as shown in the drawings in Figs. 1 and 4. It will be perceived that when the lever is pulled down to carry the cutting-wires into the clay that the end arm 69 is pushed outward by the table, and when the lever is moved upward the chain connections turn the bar 68 with the arm 69 to bear against the end of the table and results in moving the table to a position at the limit of movement in that direction.

The operation is as follows: The moving column of clay gradually pushes the table outward until it is stopped by contact with the standards or stops at the end of the frame. At the proper time the lever is drawn down and revolves the wire-frame and cuts the column into forms, after which the lever is lifted, which action, through the chain connections with the bar and arm at the end of the table, returns the table for the next supply of the column.

Having thus given a written description of my invention and the manner of making and effecting the same and explained the principle thereof and the mode in which I contemplate applying that principle, so as to distinguish it from other inventions in the art, I now proceed to particularly point out and distinctly claim the parts, improvements, and combinations.

I claim as my invention as follows:

1. In a brick and tile machine, the combination, with a supporting-frame, of a pulley-shaft, a pulley mounted thereon, a revoluble band arranged upon the pulley, and a series of radially-arranged cutting-wires, substantially as described.

2. In a brick and tile cutting table, the combination, with a supporting-frame, of a pulley-shaft, fixed pulleys mounted on said shaft, a revoluble band on each of said pulleys, wire-holding devices arranged upon said bands, and a series of cutting-wires secured at their ends to the revoluble devices and to the pulley-shaft, substantially as described.

3. In a brick and tile cutting table, the combination, with a supporting-frame, of a pulley-shaft, fixed pulleys mounted thereon, bands arranged upon said pulleys and carrying wire-holding devices, cutting-wires, and means for revolving the bands upon the fixed pulleys, substantially as described.

4. In a brick and tile cutting table, a fixed shaft, a platen on the shaft, having wire-slots, fixed pulleys on the shaft, revoluble bands on the rims of the pulleys, wire-holding bars connecting the bands, wire-holding rings on the fixed shaft, and cutting-wires connecting the said rings and wire-holding bars.

5. In a brick and tile cutting table, the combination of fixed pulleys, revoluble bands on the rims of the pulleys, wire-holding bars connecting the said bands, loose wire-holding rings on the shaft of the fixed pulleys, having apertures larger than the axle around which they turn, and cutting-wires connecting said rings and bars, substantially as described.

6. In a brick and tile cutting table, the combination of the fixed pulleys, the revoluble bands on the pulleys, bars carrying cutting-wires connecting the bands, and a lever fulcrumed on the frame of the table and formed with an arm having a notch to engage the wire-holding bars, substantially as described.

7. In a brick and tile cutting table, the combination, with the fixed pulleys and the revoluble wire-frame carried by said pulleys and a lever fulcrumed to the frame and an arm jointed to the lever and formed with a notch to engage the wire-bars of the cutting-frame and having its end extended beyond the notch, substantially as described.

8. In a brick and tile cutting table, the combination of a longitudinally-movable table, the revoluble cutting-frame, a lever fulcrumed to the frame of the table to engage and turn the cutting-frame, and a lever at the ends of the table operated by the movement of the first-named lever to push the table in one direction, substantially as described.

9. In a brick and tile cutting table, the combination of a stationary frame having side rails provided with tracks, a carriage on the tracks, a longitudinal connecting-bar between the axles of the carriage, said bar being projected beyond the axle of one of the wheels, stops on the extension of the bar, and a stop on the frame through which the rod plays between the nuts, substantially as and for the purpose specified.

10. In a brick and tile cutting table, the table-frame consisting of side rails, cross end pieces adjustably fitted on the rails, formed with bearings in the middle, and a shaft in the bearings, adapted to be adjusted endwise and held against rotation, substantially as described.

11. In a brick and tile cutting table, the table-frame consisting of side rails, end pieces formed with bearings in their middle portions, a fixed shaft in the bearings, and platens clamped on the shaft and arranged with wire-slots between them, substantially as described.

12. The combination of the fixed shaft, platens clamped thereon, and guide-rails mounted on standards in the platen, said guide-rails being composed of sections arranged with their adjacent ends to permit the cutting-wires to pass between them, substantially as described.

13. A platen for a brick and tile cutting table, consisting of a central plate and side pieces hinged thereto, substantially as described.

14. A platen for a brick and tile cutting table, consisting of a number of plates having yielding side pieces secured thereto and arranged with wire-spaces between them, substantially as described.

15. The combination of a fixed shaft arranged longitudinally of the cutting-table, a number of platen-plates secured to the shaft, and plates hinged to the side edges of the plates, and a spring to hold the hinged plates in horizontal position in alignment with the other plates, substantially as described.

In witness whereof I have hereto set my hand in the presence of two attesting witnesses.

JACOB W. BOLTZ.

Attest:
J. L. LEONARD,
W. C. LEMERT.